United States Patent [19]

Marisetty et al.

[11] Patent Number: 5,793,961
[45] Date of Patent: Aug. 11, 1998

[54] COMPUTER SYSTEM WITH DATA CONFERENCE CAPABILITY

[75] Inventors: Suresh K. Marisetty; James P. Kardach, both of San Jose, Calif.

[73] Assignee: Intel Corporation, Santa Clara, Calif.

[21] Appl. No.: 790,152

[22] Filed: Jan. 28, 1997

Related U.S. Application Data

[63] Continuation of Ser. No. 342,312, Nov. 18, 1994, abandoned.

[51] Int. Cl.⁶ .................................................. G06F 13/00
[52] U.S. Cl. ........................................ 395/200.8; 395/681
[58] Field of Search ................................ 395/800, 681, 395/200.8; 364/710.12

[56] References Cited

U.S. PATENT DOCUMENTS

| | | | |
|---|---|---|---|
| 4,482,998 | 11/1984 | Marouf | 370/62 |
| 4,951,203 | 8/1990 | Halamka | 364/419.2 |
| 5,134,648 | 7/1992 | Hochfield et al. | 379/98 |
| 5,239,538 | 8/1993 | Teel | 370/58.3 |
| 5,291,479 | 3/1994 | Vazari et al. | 370/58.2 |
| 5,357,511 | 10/1994 | DiNapoli | 370/62 |
| 5,375,068 | 12/1994 | Palmer et al. | 364/514 C |
| 5,420,852 | 5/1995 | Anderson et al. | 370/58.1 |
| 5,473,676 | 12/1995 | Frick et al. | 379/99 |
| 5,479,498 | 12/1995 | Brandman et al. | 379/283 |
| 5,483,588 | 1/1996 | Eaton et al. | 379/202 |
| 5,490,208 | 2/1996 | Remillard | 379/96 |
| 5,499,048 | 3/1996 | Seo | 348/10 |
| 5,519,641 | 5/1996 | Beers et al. | 364/514 C |
| 5,541,982 | 7/1996 | Bergler | 379/93 |

FOREIGN PATENT DOCUMENTS

| | | |
|---|---|---|
| 0309627 | 4/1989 | European Pat. Off. |
| 8703764 | 6/1987 | WIPO . |

*Primary Examiner*—Eric Coleman
*Attorney, Agent, or Firm*—Blakely, Sokoloff, Taylor & Zafman

[57] ABSTRACT

In a computer system having an audio circuit and networking circuit for data conferencing with an external network, a method of configuring the computer system for data conferencing includes the step of storing a plurality of data conferencing protocols. The method then determines which one of the plurality of data conferencing protocols is needed for the computer system for data conferencing. The computer system is then configured in accordance with a first protocol of the plurality of data conferencing protocols if the computer system is determined to require the first protocol for data conferencing. The method then selects an audio device driver and a networking device driver that correspond to the first protocol from a plurality of audio and networking device drivers for controlling operations of the audio and networking circuits. A communication link is established between the audio and networking device drivers for directly transferring digitized audio data between the audio and networking device drivers without via an interfacing operating system during data conferencing such that transmission latency of the digitized audio data is minimized. A computer system for data conferencing is also described.

21 Claims, 6 Drawing Sheets

COMPUTER SYSTEM WITH DATA CONFERENCE CAPABILITY

This is a divisional of application Ser. No. 08/342,312, filed Dec. 18, 1994, now abandoned.

FIELD OF THE INVENTION

The present invention pertains to the field of computer systems. More particularly, this invention relates to configuring a computer system for data conferencing with an external network such that transmission latency of the audio data for data conferencing is minimized and that when the data conferencing protocol of the external network changes, the computer system can be easily reconfigured with the new protocol.

BACKGROUND OF THE INVENTION

A prior art mobile personal computer systems typically includes an integrated circuit ("IC") card controller. The IC card controller is used to interface with an IC card. The IC card can be inserted into the computer system via a slot and is connected to the IC card controller when inserted. The IC card can be a memory card or a peripheral input/output ("I/O") card. For example, the IC card can be a MODEM ("modulation/demodulation") card or a LAN ("local area network") card. When the computer system requires MODEM function, the MODEM card is inserted. If the computer system requires LAN function, the LAN card is inserted. This increases the flexibility of the computer system since the computer system can be dynamically configured with different IC cards for different I/O functions.

Meanwhile, the advances in computer and telecommunications have allowed for data conferencing to occur between computer systems via a communication network. The data conferencing is also referred to as video conferencing because it involves transmitting audio and video data simultaneously across the communication network. In order for a computer system to be connected to an external communication network for data conferencing, the computer system needs to be equipped with networking function. However, because the external communication network to which a computer system is connected for data conferencing can be a simple public telephone network, an ISDN ("Integrated Services Digital Network") network, a LAN network, or an FDDI ("Fiber Distributed Data Interface") network, the computer system, when connected to the network, needs to be configured with the appropriate networking function that corresponds to the type of the network to which the computer system is connected. For example, if the computer system is connected to an ISDN network or a public telephone network, a MODEM circuit is required for the computer system. When the computer system is connected to a LAN network, a LAN interfacing circuit is required for the computer system. Because the computer system can be dynamically configured with different IC cards of different I/O functions, as described above, the computer system does not need to install the MODEM, LAN, and other networking circuits on the printed circuit board of the computer system. When the MODEM circuit is required, the MODEM card is used. When the LAN circuit is required, the LAN card is used.

Disadvantages are, however, associated with such computer system for data conferencing. One disadvantage is that although different cards can be used to connect the computer system to different types of networks for data communications and data conferencing, the computer system may still not be able to communicate with another computer system via the network for data conferencing even through the computer system is configured with the appropriate networking card. For example, when the computer system is configured with a MODEM card and is connected to the public telephone network, the computer system may still not be able to communicate with a remote computer system via the public telephone network for data conferencing. This is because there are many different standards or protocols for mixing audio data with image data and other data for data conferencing. If the computer system connected to the network uses different standard or protocol to mix data for data conferencing than the protocol used by the network, the computer system will not be able to conduct data conferencing through the network.

Another disadvantage is that the transmission latency of the audio data is relatively high for data conferencing. This is due to the fact that the networking card of the computer system typically does not include audio recording and playback functions because the computer system itself typically includes audio hardware for audio recording any playback functions. This is to avoid duplicated audio hardware for the computer system. When the card and its related software device driver separate the audio data from the data received from the network for data conferencing, the audio data need to travel through many layers of software and hardware of the computer system before being finally applied to the audio hardware of the computer system. This typically causes the transmission latency of the audio data to be relatively high.

SUMMARY AND OBJECTS OF THE INVENTION

One of the objects of the present invention is to allow a computer system to be capable of conducting data conferencing with an external network having different data conferencing protocols.

Another object of the present invention is to minimize transmission latency of digitized audio data between an audio device driver and a networking device driver of a computer system for data conferencing.

A computer system for data conferencing includes an audio circuit for converting audio signals and digitized audio data into each other and a networking circuit for mixing and separating the digitized audio data into and from data conferencing data for data conferencing with an external network. An audio device driver is provided for controlling operation of the audio circuit. A networking device driver is provided for controlling operation of the networking circuit. A communication link is provided between the device drivers for directly transferring the digitized audio data between the device drivers without via an operating system of the computer system during data conferencing such that transmission latency of the digitized audio data is minimized. The device drivers interface with the operating system.

In a computer system having an audio circuit and a networking circuit for data conferencing with an external network, a method of configuring the computer system for data conferencing includes the step of storing a plurality of data conferencing protocols. The method then determines which one of the plurality of data conferencing protocols is needed for the computer system for data conferencing. The computer system is then configured in accordance with a first protocol of the plurality of data conferencing protocols if the computer system is determined to require the first protocol for data conferencing with the external network.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
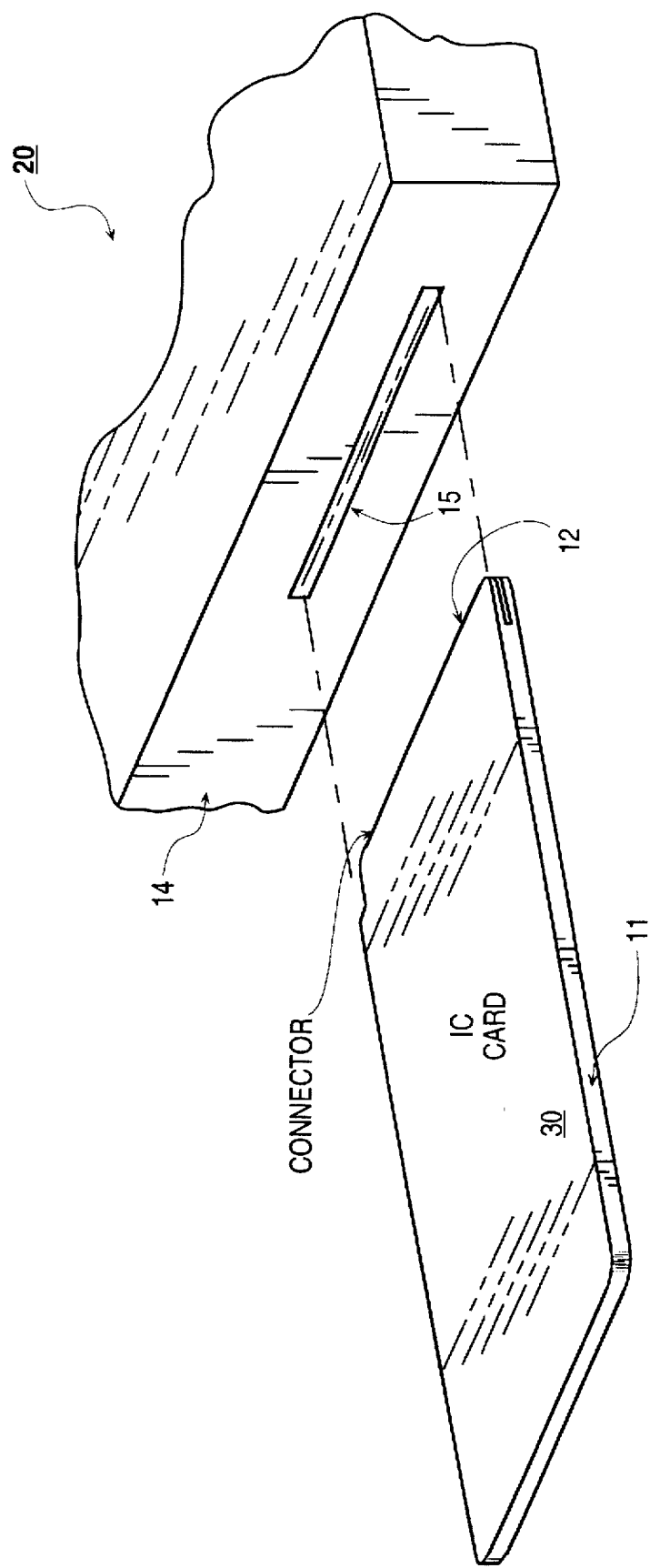
FIG. 1 is a perspective view of a portion of a computer system and an IC card to be inserted into the computer system.

FIG. 1 is a perspective view of an IC card 30 and a portion of a computer system 20. Computer system 20 implements one embodiment of the present invention, which will be described in more detail below. As can be seen from FIG. 1, computer system 20 includes a slot or opening 15 on housing 14. IC card 30 is inserted into slot 15 of computer system 20. Once inserted into slot 15, the circuitry of IC card 30 is then connected, via a connector (not shown) of IC card 30, to the circuitry of computer system 20 residing inside housing 14. Alternatively, computer system 20 may include two or more openings or slots, each can be inserted with one IC card. The architecture of computer system 20 with IC card 30 is shown in FIG. 2, which will be described in more detail below.

Figure 2:
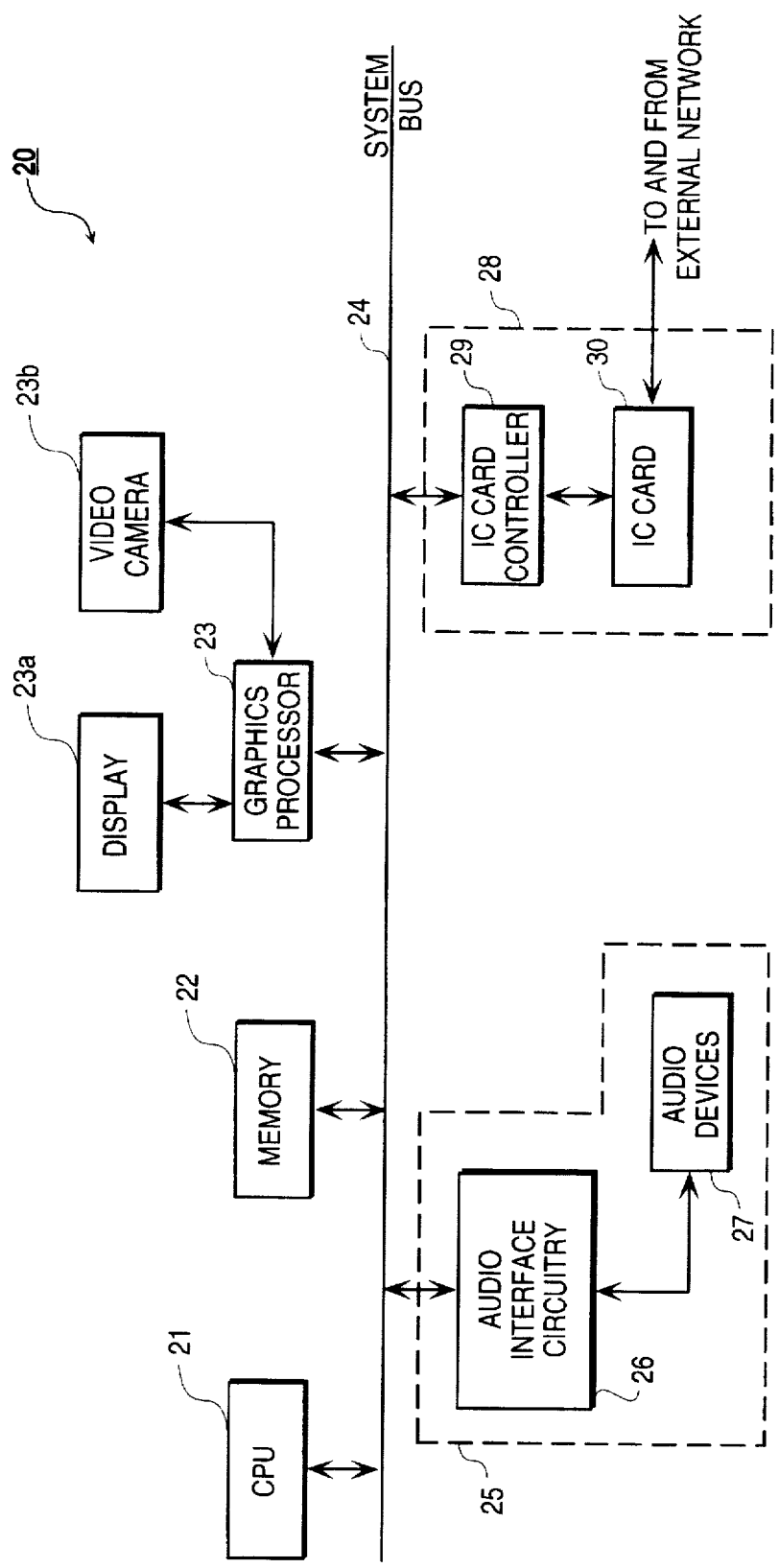
FIG. 2 is a block diagram of the computer system of FIG. 1 when the IC card is inserted into the computer system, wherein the IC card is a networking card and the computer system is capable of data conferencing.

Referring to FIG. 2, computer system 20 is capable of conducting data conferencing with a remote computer system (not shown) via an external communication network (also not shown). Computer system 20 is connected to the external network. Computer system 20 operates in a multi-media environment and supports integrated digital media and interactive three-dimensional ("3-D") graphics and models.

For one embodiment, computer system 20 is a personal computer system. For other embodiments, computer system 20 can be a laptop or notebook computer system, a digital assistant data processing system, or any other computer system or data processing system.

Computer system 20 includes a central processing unit ("CPU") 21. CPU 21, for one embodiment, includes a microprocessor manufactured and sold by Intel Corporation of Santa Clara, Calif. Alternatively, CPU 21 can include more than one microprocessor.

CPU 21 is connected to a system bus 24. System bus 24 is also connected to a memory 22 and a graphics processor 23. Memory 22 is used in computer system 20 to store operating system, data, and application programs of computer system 20. Memory 22 may include a system memory and a mass storage device. The system memory of memory 22 may include nonvolatile memory, volatile memory, or a combination of both. The mass storage device may include a hard disk.

Graphics processor 23 is connected to a display 23a and a digital video camera 23b. Graphics processor 23 is used to process image and graphics data displayed on display 23a and to process image data recorded by a digital video camera 23b. In addition, graphics processor 23 also controls (1) video camera 23b to record images and (2) display 23a to display the images recorded by camera 23b.

Display 23a is used to display information and video images for computer system 20. The video images can be captured or recorded by video camera 23b or received from the external network to which computer system 20 is connected during data conferencing. Video camera 23b is used in computer system 20 to record visual images for computer system 20 for data conferencing.

With display 23a and video camera 23b, computer system 20 also includes video recording and playback functions. In this case, the video recording and playback functions may be implemented in graphics processor 23 and are not shown in FIG. 2.

Computer system 20 also includes audio recording and playback functions. The audio functions of computer system 20 is implemented by audio hardware 25 that includes audio interface circuitry 26 and audio devices 27 connected to audio interface circuitry 26. Audio devices 27 may include a microphone and a speaker. Audio hardware 25 can be implemented by any known audio hardware.

Computer system 20 also includes networking hardware 28. Networking hardware 28 is used to connect computer system 20 to the external network for data communications and data conferencing. Networking hardware 28, however, does not include any audio hardware for audio functions. As can be seen from FIG. 2, networking hardware 28 includes an IC card controller 29 and IC card 30. IC card 30 is then connected to the external network. IC card 30 includes necessary circuitry for connecting computer system 20 to the external network for data communications. The necessary circuitry in IC card 30 depends on the type of the external network to which computer system 20 is connected. For example, if the external network is the public telephone network, then the necessary circuitry contained in IC card 30 is the MODEM circuitry and IC card 30 is a MODEM card.

Figure 3:
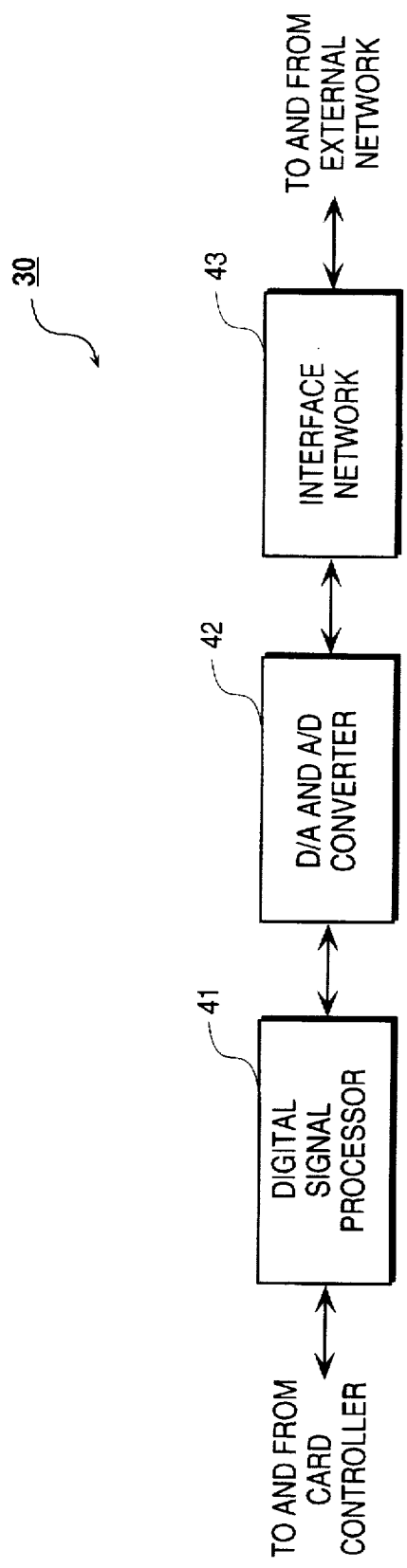
FIG. 3 shows in block diagram form circuitry of the IC card of FIGS. 1 and 2 when the computer system is connected to a public telephone network.

The external network to which computer system 20 is connected can be any kind of known network system. For example, the external network can be a public telephone network, an ISDN network, a LAN network, or a FDDI network. When computer system 20 is connected to the public telephone network, a MODEM card is used as IC card 30. When computer system 20 is connected to the LAN network, then a LAN card is used as IC card 30. FIG. 3 shows in block diagram form the circuitry of IC card 30 of FIG. 2 when IC card 30 is the MODEM card.

Referring to FIG. 3, IC card 30 (i.e., MODEM card 30) includes a digital signal processor ("DSP") 41, a D/A and A/D converter 42, and a network interface 43. DSP 41 is connected to card controller 29 (FIG. 2). DSP 41 is also connected to converter 42. Converter 42 is then connected to network interface 43. Network interface 43 is then connected to the external network.

DSP 41 performs all digital signal processing functions of card 30. These processing functions include modulating data received from computer system 20 into digitized signal, and demodulating the digitized signal received from the external network via converter 42 into digital data. DSP 41 can be any kind of known digital signal processor for a modem circuit.

D/A and A/D converter 42 receives the digitized signal from DSP 41 and converts the digitized signal into analog signal suitable for transmission over the external network. The converted analog signal is then applied to the external network via network interface 43. When converter 42 receives data in modulated analog signal form from the external network, converter 42 converts the analog signal into digitized signal. Converter 42 can be any known D/A and A/D converter circuit for a modem and network interface 43 can be implemented by any known interface circuit.

Figure 4:
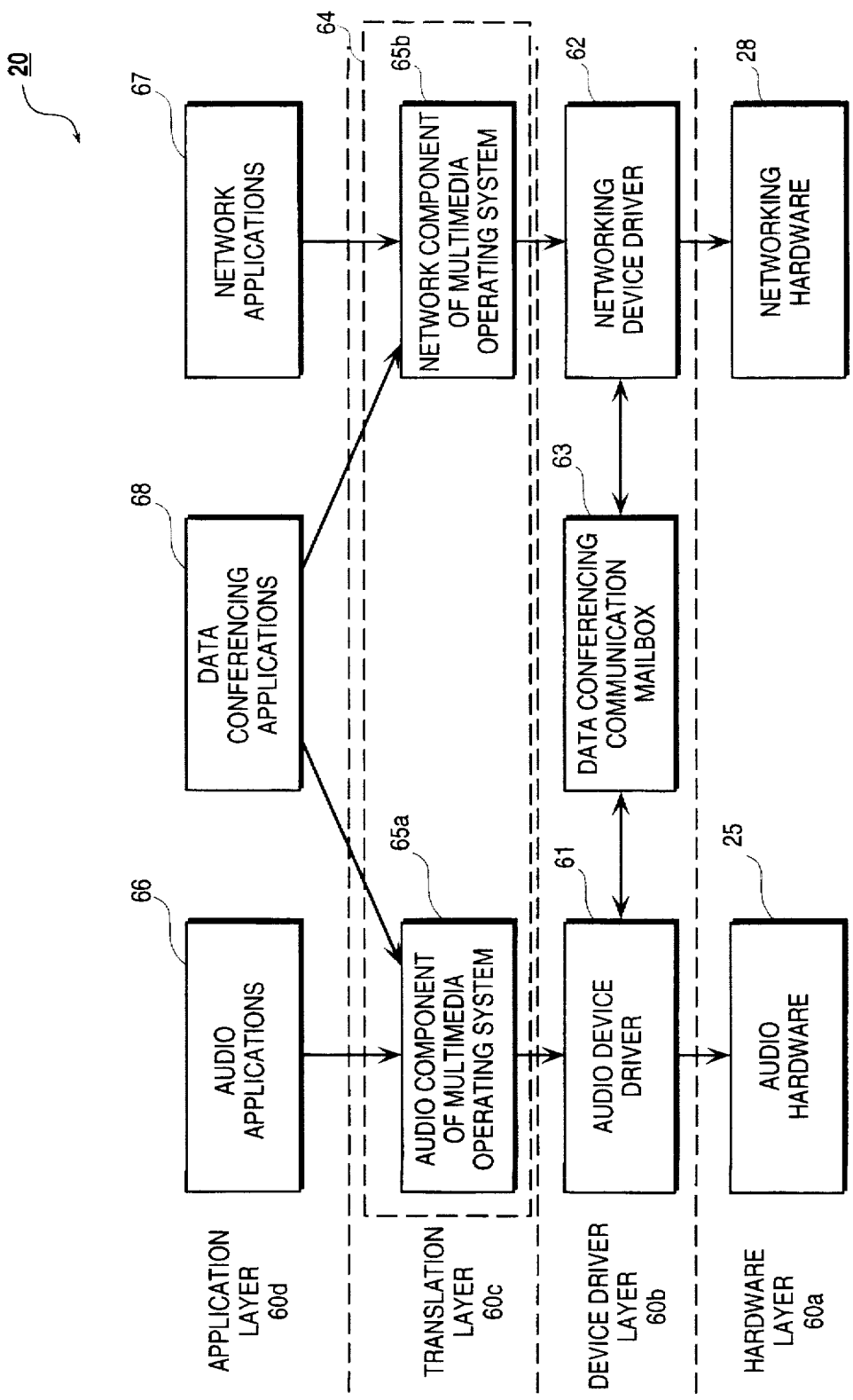
FIG. 4 is a block diagram of different layers of software and hardware of the computer system of FIGS. 1 and 2 for data conferencing.

FIG. 4 shows computer system 20 of FIG. 2 arranged in different layers with respect to audio and networking hardware 25 and 28 for data conferencing. FIG. 4 also shows one embodiment of the present invention. As can be seen from FIG. 4, computer system 20 includes a hardware layer 60a, a device driver layer 60b, a translation layer 60c, and an application layer 60d. Layers 60b through 60d are software layers. Hardware layer 60a includes audio and networking hardware 25 and 28. Device driver layer 60b includes an audio device driver 61 and a networking device driver 62. Audio device driver 61 controls operations of audio hardware 25 and networking device driver 62 controls operations of networking hardware 28. Both device drivers 61 and 62 are controlled by a multi-media operating system 64 of computer system 20. As can be seen from FIG. 4, multimedia operating system 64 includes an audio component 65a and a networking component 65b. Operating system 64 is then interfaced with audio applications 66 and networking applications 67. In addition, operating system 64 also interfaces with data conferencing applications 68. Data conferencing applications 68 include high-level application programs for allowing computer system 20 to conduct data conferencing. Data conferencing applications 68 causes audio and networking device drivers 61 and 62 to control and monitor mixing of audio data into data conferencing data and separation of the audio data from the data conferencing data for data conferencing by audio and networking hardware 25 and 28.

Data conferencing applications 68 can be any known data conferencing application programs. Similarly, audio and networking applications 66 and 67 also include known application programs, such as voice control, voice annotation, voice mail, voice playback, and network control. Moreover, multi-media operating system 64 can be any known multi-media operating system.

Audio and networking device drivers 61 and 62 are hardware-specific device drivers. Audio device driver 61 controls audio hardware 25 to record and playback audio messages, etc. Networking device driver 62 controls networking hardware 28 to transmit and receive data to and from the external network. In addition, network device driver 62 processes the data received and transmitted. The processing function includes mixing and separating data in accordance with certain protocol or standard. Audio device driver 61 is a pre-packaged software available on the market. Networking device driver 62 is also a pre-packaged software available on the market. Audio device driver 61 is, however, dependent upon the selection of audio hardware 25. Audio device driver 61 typically comes together with audio hardware 25.

Similarly, networking device driver 62 also needs to be dependent on networking hardware 28. If networking hardware 28 is a MODEM, networking device driver 62 can be any known MODEM device driver. If networking hardware 28 is a LAN interface circuit, networking device driver 62 can be any known LAN device driver. Networking device driver 62 typically comes together with networking hardware 28.

In order for computer system 20 to allow data conferencing via the external network, audio and networking device drivers 61 and 62 need to be configured with an appropriate data conferencing protocol adopted by the external network. The appropriate data conferencing protocol is used to govern the mixing of the audio data with the image data or other data into the data conferencing data for data conferencing in computer system 20. The protocol also governs the separation of the audio data from the data conferencing data.

There are, however, currently many known data conferencing protocols for data conferencing. For example, the data conferencing protocol can be a code-or-voice protocol or a code-and-voice protocol. Each protocol comes in a device driver form. As is known, if computer system 20 is configured with a data conferencing protocol different from the protocol adopted by the external network, computer system 20 cannot conduct data conferencing with the external network. Therefore, device drivers 61 and 62 need to be configured with the appropriate data conferencing protocol of the external network.

Figure 5:
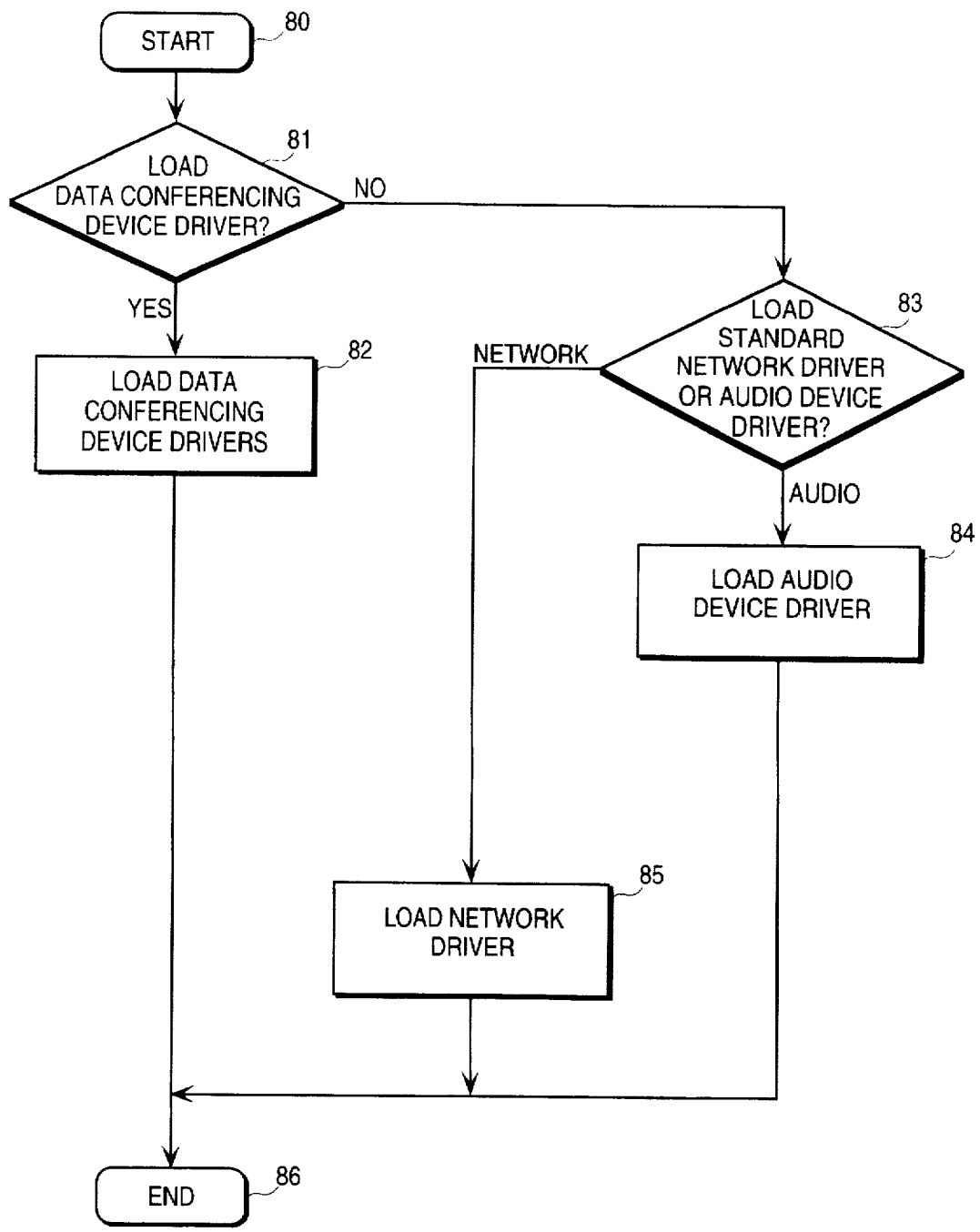
FIG. 5 shows the process of configuring the networking device driver of the computer system.
Figure 6:
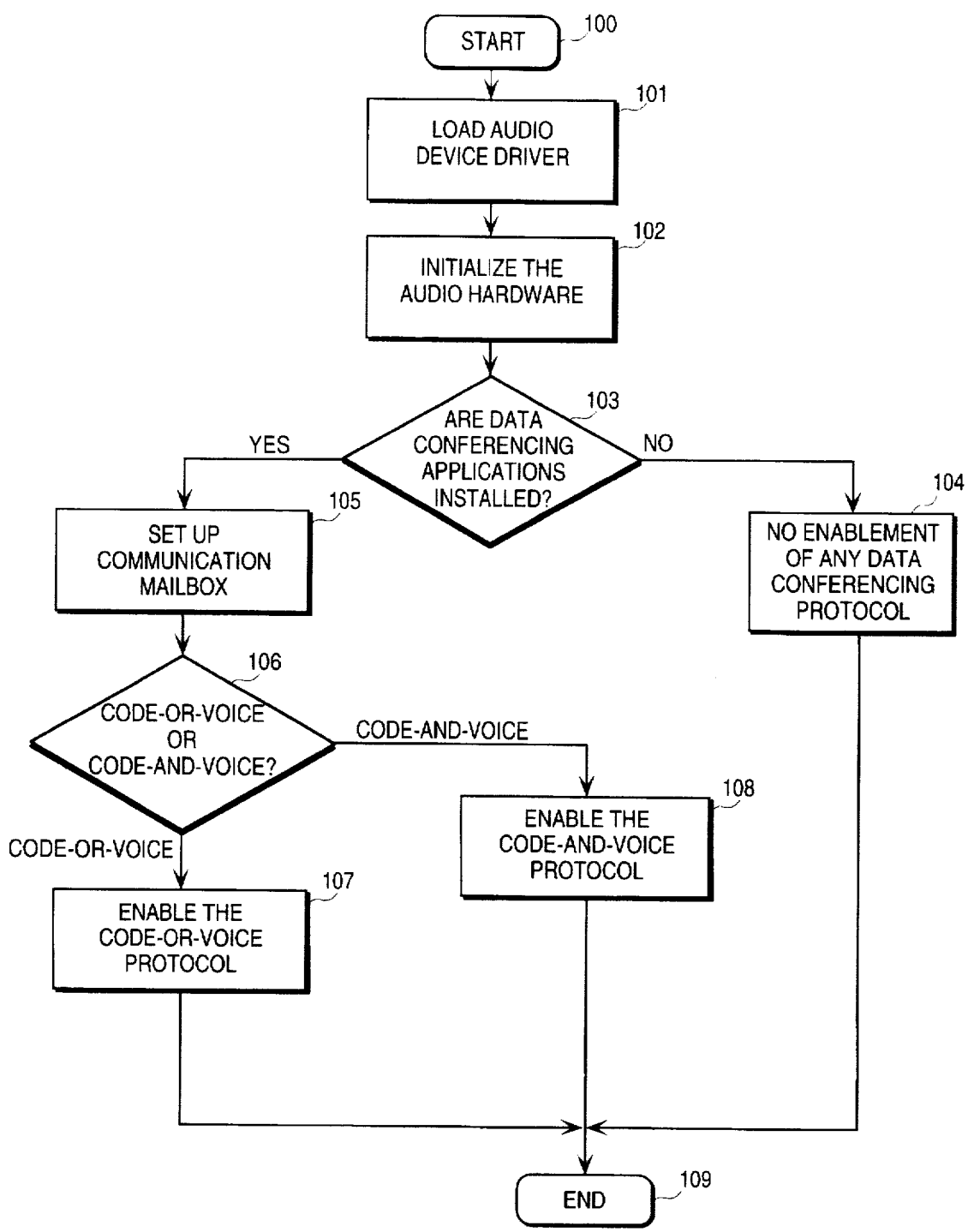
FIG. 6 shows the process of configuring the audio device driver of the computer system.

In accordance with one embodiment of the present invention, device drivers 61 and 62 are dynamically configured with the data conferencing protocol of the external network. In this embodiment, all the known data conferencing protocols (not shown in FIG. 4) are stored in computer system 20, preferably in memory 22 of FIG. 2. The appropriate protocol adopted by the external network for data conferencing is first determined. Once the protocol of the external network is determined, computer system 20 configures device drivers 61 and 62 with the appropriate protocol. Computer system 20 can select the appropriate protocol from the protocols stored in memory 22 and then enable the selected protocol for device drivers 61 and 62. This allows computer system 20 to dynamically change its data conferencing protocol to adapt to any change in protocol from the external network. This allows computer system 20 to conduct data conferencing with different computers configured with different data conferencing protocols via the network. For example, computer system 20 may be communicating with one remote computer for data conferencing in accordance with a first protocol via the network. When computer system 20 is then connected to a second remote computer via the network for data conferencing and when the second remote computer is configured with a second data conferencing protocol, computer system 20 can simply reconfigure device drivers 61 and 62 from the firs protocol to the second protocol. This therefore provides flexibility for computer system 20 to conform to the protocols adopted by other systems for data conferencing. FIGS. 5 and 6 show the processes of dynamically configuring device drivers 61 and 62 with a selected data conferencing protocol, which will be described in more detail below.

Referring again to FIG. 4, in accordance with another embodiment of the present invention, computer system 20 also includes a data conferencing communication mailbox 63. Mailbox 63 is established between drivers 61 and 62 for allowing direct communication between device drivers 61 and 62 such that audio and networking device drivers 61 and 62 communicate with each other via mailbox 63 to exchange the audio data directly for data conferencing. This substantially minimizes transmission latency of the audio data. In addition, no extra audio hardware is used in networking hardware 28 to achieve low transmission latency of the audio data for data conferencing because audio hardware 25 is the existing audio hardware of computer system 20. This also causes computer system 20 to be more cost effective for data conferencing. Mailbox 63 is established when device drivers 61 and 62 are configured with a data conferencing protocol. Mailbox 63 can be established by any known means. For example, a device driver call routine can be used in device drivers 61 and 62 to establish the mailbox. When audio device driver 61 needs to transfer the audio data to networking device driver 62, device driver 61 calls for the device driver call routine to transfer the audio data to networking device driver 62. Likewise, when networking device driver 62 needs to transfer the audio data to audio device driver 61, networking device driver 62 also calls for the routine to transfer the audio data. FIGS. 5 and 6 also show the processes of establishing communication mailbox 63, which will be described in more detail below.

Referring to FIG. 5, the process for configuring networking device driver 62 of FIG. 4 for data conferencing is shown. The process starts at step 90. At step 91, networking device driver 62 is loaded into computer system 20. Step 92 is an initialization step at which networking hardware 28 is set up by the loaded networking device driver. In addition, the loaded networking device driver also checks the system software environment of computer system 20 at step 92.

Step 93 is a judgment step at which it is determined whether the networking device driver loaded should be configured for data conferencing. If is determined at step 93 that the loaded networking device driver does not need to be configured for data conferencing, then step 98 is performed at which no data conferencing protocol is enabled for networking device driver 62. The process then ends at step 99.

If, however, it is determined at step 93 that the loaded networking device driver needs to be configured for data conferencing, then step 94 is performed. At step 94, the communication mailbox (i.e., mailbox 63) to audio device driver 61 is set up. As described above in conjunction with FIG. 4, the communication mailbox is employed to transmit audio data to and from audio device driver 61 for data conferencing such that the audio data need not travel through layers 60c and 60d of computer system 20 before reaching audio device driver 61. This substantially minimizes the transmission latency of the audio data during data conferencing.

The communication mailbox can be established by any known means at step 94. For example, a common storage area can be defined by the two device drivers. As a further example, a device driver call routine can be configured into the networking device driver at step 94 to establish the mailbox. The process then goes to step 95.

At step 95, a determination is made to find out which data conferencing protocol should be enabled for the networking device driver. The determination can be done in any known manner. For example, the determination can be conducted by checking a hardware flag bit set by the user and/or the external network to indicate the desired protocol.

FIG. 5 only shows the selection of two data conferencing protocols. In practice, many more protocols may be included for selection. If it is determined at step 95 that the code-and-voice protocol should be used, then the process goes to step 97 at which the code-and-voice protocol is enabled (i.e., selected). The process then ends at step 99.

If, at step 95, it is determined that the code-or-voice protocol should be used, then the process goes to step 96, at which the code-or-voice protocol is enabled (i.e., selected). The process then ends at step 99.

The enablement or selection of a data conferencing protocol can be implemented by any known means. For example, a known chooser program can be included in the operating system for selecting and enabling the selected protocol. When the chooser program is activated, all the protocols stored in computer system 20 will appear on display 23a of computer system for selection. The user only needs to click on the icon or symbol of the selected protocol on display 23a. Moreover, computer system 20 may include a protocol monitor program that detects the protocol used by the other system via the network and then selects and enables the protocol used by the other system in computer system 20. When a protocol is enabled, the loaded networking device driver will then mix and separate data conferencing data for data conferencing in accordance with the protocol enabled.

FIG. 6 shows the process of configuring audio device driver 61 of FIG. 4 for data conferencing. The process starts at step 100. At step 101, audio device driver 61 is loaded. At step 102, audio hardware 25 of FIG. 4 is initialized and the system software environment is checked. The process then goes to step 103 at which it is determined if data conferencing is required for computer system 20 and if the data conferencing applications are installed in computer system 20. If the answer is no, then the process goes to step 104 at which no data conferencing protocol is enabled for the audio device driver. The process then ends at step 109.

If, however, at step 103, computer system 20 requires data conferencing, then the process goes to step 105 at which communication mailbox 63 from the audio device driver to networking device driver 62 is established. As described above, communication mailbox 63 is established by known means. The process then goes to step 106 at which another determination is made to find out which data conferencing protocol should be enabled for the audio device driver. As described above in conjunction with FIG. 5, the determination can be done in any known manner.

Again, FIG. 6 only shows the selection of two data conferencing protocols. In practice, many more protocols may be included for selection. If it is determined at step 106 that the code-and-voice protocol should be used, then the process goes to step 108 to enable that protocol. If it is determined at step 106 that the code-or-voice protocol should be used, then the process goes to step 107 to enable that protocol. The process ends at step 109.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A networking apparatus for data conferencing, comprising:

(A) a software audio device driver for controlling operation of an audio circuit, the software audio device driver including a first audio device driver interface and a second audio device driver interface;

(B) a software networking device driver for controlling operation of a networking circuit, the software networking device driver including a first networking device driver interface and a second networking device driver interface; and (C) a direct communication link between the second audio device driver interface and the second networking device driver interface for directly transferring data between the software audio device driver and the software networking device driver, independent of an operating system such that transmission latency is minimized.

2. The networking apparatus of claim 1, wherein the communication link is a software established mailbox for allowing exchange of data between the software audio device driver and the software networking device driver.

3. The networking apparatus of claim 1, further comprising a means for selecting the software networking device driver from a plurality of data conferencing networking device drivers, wherein said means detects the appropriate communications protocol for the corresponding data conferencing networking device driver.

4. The networking apparatus of claim 1, further comprising a means for selecting the software audio device driver from a plurality of audio device drivers in accordance with the protocol for controlling operation of the audio circuit.

5. The networking apparatus of claim 1, wherein the networking circuit is an integrated circuit card that is removably inserted into the computer system.

6. A computer system for data conferencing, comprising:
(A) a processor;
(B) a computer-readable storage medium;
(C) an audio circuit for converting audio signals into digitized data;
(D) a networking circuit for processing the digitized data for data conferencing with an external network;
(E) a software audio device driver for controlling operation of an audio circuit, the software audio device driver including a first audio device driver interface and a second audio device driver interface;
(F) a software networking device driver for controlling operation of a networking circuit, the software networking device driver including a first networking device driver interface and a second networking device driver interface; and
(G) a direct communication link between the second audio device driver interface and the second networking device driver interface for directly transferring data between the software audio device driver and the software networking device driver, independent of an operating system such that transmission latency is minimized.

7. The computer system of claim 6, wherein the communication link is a software established mailbox for allowing exchange of data between the software audio device driver and the software networking device driver.

8. The computer system of claim 6, further comprising a means for selecting the software networking device driver from a plurality of data conferencing networking device drivers, wherein said means detects the appropriate communications protocol for the corresponding data conferencing networking device driver.

9. The computer system of claim 6, wherein the networking circuit is located inside an integrated circuit card that is removably inserted into the computer system.

10. The computer system of claim 6, further comprising a means for selecting the software audio device driver from a plurality of audio device drivers in accordance with the protocol for controlling operation of the audio circuit.

11. A method for forming a data conferencing network comprising the steps of:

(A) establishing a communication link between a software audio device driver and a software networking device driver; and
(B) transferring the data directly between the software audio device driver and the software networks device driver through the communication link, independent of an operating system such that transmission latency is minimized.

12. The method of claim 11, further comprising the step of detecting the communication protocol of the external network prior to the step of selecting the software networking device driver in accordance with the communication protocol.

13. The method of claim 11, further comprising the step of determining a communication protocol adopted by the external network for data conferencing.

14. The method of claim 11, further comprising the step of selecting the software networking device driver from a plurality of data conferencing networking device drivers in accordance with a communication protocol set up by external network.

15. The method of claim 11, further comprising the step of selecting the software audio device driver from a plurality of audio device drivers in accordance with a protocol for controlling the operation of the audio circuit.

16. The method of claim 11, wherein the communication link is a software established mailbox for allowing exchange of the digitized audio data between the software audio device driver and the software networking device driver.

17. The method of claim 11, wherein the software audio device driver controls an audio circuit.

18. The method of claim 11, wherein the software networking device driver controls a networking circuit for data conferencing with an external network.

19. The method of claim 11, wherein the software audio device driver is one of a plurality of audio device drivers and the software networking device driver is one of a plurality of networking device drivers such that each of the plurality of audio device drivers and networking device drivers corresponds to one of a plurality of protocols.

20. An article of manufacture for use in a computer system having an operating system, the article of manufacture comprising a computer usable medium having computer readable program code means embodied in said medium, the program code means including:

computer readable code means embodied in said computer usable medium for causing a computer to establish a communication link between a software audio device driver and a software networking device driver; and computer readable code means embodied in said computer usable medium for causing a computer to transfer the data directly between the software audio device driver and the software networking device driver through the communication link, independent of an operating system such that transmission latency of data is minimized.

21. An article of manufacture for use in a computer system having an operating system, the article of manufacture comprising a computer usable medium having computer readable program code means embodied in said medium, the program code means including:

computer readable code means embodied in said computer usable medium for causing a computer to control a software audio device driver for operation of an audio circuit, the software audio device driver including a first audio device driver interface and a second audio device driver interface;

computer readable code means embodied in said computer usable medium for causing a computer to control a software networking device driver for operation of a networking circuit, the software networking device driver including a first networking device driver interface and a second networking device driver interface; and computer readable code means embodied in said computer usable medium for causing a computer to establish a communication link between the second audio device driver interface and the second networking device driver interface for directly transferring data between the software audio device driver and the software networking device driver through the communication link, independent of an operating system such that transmission latency of data is minimized.

* * * * *